United States Patent
Seo et al.

(10) Patent No.: US 7,440,672 B2
(45) Date of Patent: Oct. 21, 2008

(54) OPTICAL FIBER FOR OPTICAL AMPLIFIER AND PROCESS FOR MANUFACTURING THEREOF

(75) Inventors: Young-beom Seo, Seoul (KR); Jae-hong Lim, Seoul (KR); Dae-weon Kim, Seongnam-shi (KR)

(73) Assignee: LG Cable Ltd., Seoul (KR)

( * ) Notice: Subject to any disclaimer, the term of this patent is extended or adjusted under 35 U.S.C. 154(b) by 0 days.

(21) Appl. No.: 10/514,102

(22) PCT Filed: May 13, 2003

(86) PCT No.: PCT/KR03/00942

§ 371 (c)(1),
(2), (4) Date: Apr. 18, 2005

(87) PCT Pub. No.: WO03/096086

PCT Pub. Date: Nov. 20, 2003

(65) Prior Publication Data

US 2005/0175309 A1    Aug. 11, 2005

(30) Foreign Application Priority Data

May 13, 2002  (KR) .................. 10-2002-0026265

(51) Int. Cl.
*G02B 6/00* (2006.01)
*H01S 3/00* (2006.01)
*H04B 10/12* (2006.01)

(52) U.S. Cl. .............. 385/142; 385/141; 385/127; 359/341.5

(58) Field of Classification Search ............ 372/6, 372/39, 41; 385/139, 141–145, 123–128; 359/337.4, 334, 341.1, 341.5
See application file for complete search history.

(56) References Cited

U.S. PATENT DOCUMENTS

| | | | |
|---|---|---|---|
| 6,574,406 B2 * | 6/2003 | Ainslie et al. | 385/123 |
| 6,597,493 B2 * | 7/2003 | Islam | 359/334 |
| 6,690,868 B2 * | 2/2004 | Anderson et al. | 385/123 |
| 6,797,657 B2 * | 9/2004 | Ellison et al. | 501/44 |
| 2003/0039026 A1 * | 2/2003 | Nishihara et al. | 359/337.4 |

OTHER PUBLICATIONS

English-language translation of an International Preliminary Examination Report dated Nov. 1, 2004 in connection with International Application No. PCT/KR2003/000942.

* cited by examiner

*Primary Examiner*—Kevin S Wood
(74) *Attorney, Agent, or Firm*—John P. White; Cooper & Dunham LLP

(57) ABSTRACT

The present invention relates to an optical fiber for an optical amplifier and a method for manufacturing the same, which can be applied to an optical transmission system in the S-band area (4130 nm-1530 nm). According to the present invention, silica is used as a base material and the optical fiber for an optical amplifier contains $Tm^{3+}$ ions and metal ions in a first core layer formed on an inner surface of a second core layer using the MCVD (Modified Chemical Vapor Deposition) method and a solution doping method whereby the practicability and productivity of the optical fiber are remarkably improved.

5 Claims, 4 Drawing Sheets

ND PROCESS FOR MANUFACTURING
THEREOF

OPTICAL FIBER FOR OPTICAL AMPLIFIER AND PROCESS FOR MANUFACTURING THEREOF

TECHNICAL FIELD

This application is a §371 National Stage of PCT International Application No. PCT/KR03/00942, filed May 13, 2003, designating the United States and claiming priority of Korean Patent Application No. 2002-0026265, filed May 13, 2002, the contents of which are hereby incorporated by reference.

The present invention relates to an optical fiber for an optical amplifier and a method for manufacturing the same which can be applied to an optical transmission system in the S-band of 1430 nm to 1530 nm, and it is a purpose of the invention to manufacture an optical fiber capable of optical amplification in the S-band by forming an optical fiber preform of a silica-based glass composition and doping with rare-earth ions and metal ions on a first core layer formed on an inner surface of a core layer using the MCVD (Modified Chemical Vapor Deposition) method and a solution doping method.

BACKGROUND ART

Generally, optical communication is divided into a transmitter unit for changing an electric signal into an optical signal, an optical fiber carrying the optical signal, and a receiver unit for changing the optical signal into an electric signal.

In the optical fiber, which is a passive component carrying the optical signal, the optical signal is absorbed by electronic transition of the positive ions of glass in the case of a short wavelength, and the optical signal is absorbed by molecular vibration in the case of a long wavelength. Thus only wavelengths ranging about 1200 nm to 1700 nm may be used for optical communication.

However, only the band of about 1300 nm wavelength and the band of near 1550 nm wavelength are used for the optical communication due to the effects of impurities, such as $OH^-$ groups and transition metals contained in the glass which is a preform.

While the 1550 nm band is mainly used over long distance transmission since the transmission loss of silica glass optical fiber is the smallest, the 1300 nm band is mainly used for short wavelength transmission, which is a zero-dispersion wavelength region of a silica glass optical fiber (John B. MacChensey, David J. DiGiovanni, J. Am. Ceram. Soc., 73[12], 1990).

However, the silica glass optical fiber absorbs light as well as transmits light. By this absorption, losses are accumulated and the strength of the signal light decreases exponentially as the transmission distance becomes longer.

To amplify the decreased signal, an amplifier for amplifying the signal should be set at intervals of tens of km in an optical fiber network. At first, for the amplifier of this type, an optical signal is changed into an electric signal and then the signal is amplified. But this method failed in practical use due to the errors generated during an amplification procedure and a time delay to amplify the optical signal.

Therefore, instead of the above-described amplification method, an optical fiber amplifier for amplifying the optical signal itself without conversion to the electric signal has been studied actively.

For the first optical amplifier, an optical amplifier using a barium crown glass as a base material and doped with neodymium was studied (C. J. Koester and E. Snitzer, Appl. Opt., Vol. 3, pp 1182-1186, 1964).

Afterwards, in the late 1980's, erbium doped fiber amplifiers (EDFA) were developed and commercialized, which amplifies wavelengths of the 1550 nm band where the signal loss of a silica optical fiber is the smallest (w. J. Miniscalco, J. Lightwave Technol., Vol. 9, pp234-250, 1991).

However, due to a rapid increase of information transmission quantity, the band width available in conventional wavelength division multiplexing (WDM) techniques has been saturated, thus there was a need for optical amplifiers available in a new band width.

First, using a gain-shifted EDFA, the available wavelength band width was extended to a 1600 nm band which has longer wavelengths than the 1550 nm band. But this band has been also saturated, so there is a need for an optical amplifier in another wavelength band.

Meanwhile, the 1480 nm band adjacent to the 1550 nm band is easily accessible. In the optical amplifier available in the S-band (1430 nm~1530 nm), an optical fiber for the optical amplifier containing $Tm^{3+}$ ions is currently being studied and developed.

A fluorescence caused by a transition of $Tm^{3+}$ from $^3H_4$ to $^3F_4$ level has a central wavelength of 1480 nm and make the optical amplification possible in the S-band.

However, it is difficult to get a 1480 nm fluorescence caused by transition from $^3H_4$ to $^3F_4$ level with a silica glass having lattice vibration energy of about 1100 $cm^{-1}$ since the interval between $^3H_4$ and $^3H_5$ level (lower level) of $Tm^{3+}$ is not more than about 4200 $cm^{-1}$. That is, a thermal transition to $^3H_5$ level (lower level), which is absorbed into lattice vibration of a glass perform, occurs instead of the transition from $^3H_4$ level to $^3F_4$ level.

Therefore, the aim of the current research and development is to get a 1480 nm fluorescence caused by the transition of $Tm^{3+}$ from $^3H_4$ level to $^3F_4$ level using fluoride glass and sulfide glass with a small amount of lattice vibration energy.

As a result of a recent research, T Kasamatsu published an article (Laser-Diode-Pumped Highly Efficient Gain-Shifted Thulium-Doped Fiber Amplifier Operating in the 1480-1510 nm Band, IEEE Photonics Technology Letters, vol. 13, No. 5, 433-435, 2001) wherein 1480 nm fluorescence is obtained by using a fluoride glass as a base material.

Furthermore, the generation of 1480 nm fluorescence from fluoride glass and its mechanism are explained by Y. B. Shin in an article (Multiphonon and cross relaxation phenomena in Ge—As (or Ga)—S glasses doped with $Tm^{3+}$, Journal of Non-Crystalline Solids, 208, pp 29-35, 1996).

As another result of the research, U.S. Pat. No. 6,266,181 discloses an optical fiber amplifier using a tellurite glass as a base material. Also, according to an article "Influence of 4f absorption transitions of $Dy^{3+}$ on the emission spectra of $Tm^{3+}$-doped tellurite glasses" by Y. G. Choi in Journal of Non-Crystalline Solids, 276, pp 1-7, 2000, 1480 nm fluorescence was obtained.

However, there are many difficulties in connecting with silica-based optical fibers using the fluoride glass, sulfide glass or tellurite glass.

In other words, when the non-silica based optical fiber is connected to the silica-based optical fiber, the quality of signal is degraded incurring the loss of signal due to the difference in their own refractive indexes. Furthermore, conventional fusion splicing procedures cannot be applied because of the difference in softening temperatures of both fibers.

Moreover, since an optical fiber is manufactured by a fusion method, the optical fiber may contain impurities, such as OH⁻ groups and transition metals thereby causing a defect in the optical fiber.

Light loss reaches at about 200 dB/m and the manufactured optical fiber has low chemical endurance due to the penetration of OH⁻ groups. These reasons make it difficult to be put to a practical use.

DISCLOSURE OF INVENTION

The present invention has been developed for the purpose of solving the foregoing problems and thus it is an object of the present invention to provide an optical fiber for the S-band of 1430 nm to 1530 nm, which has a low manufacturing cost and offers stable optical characteristics and convenience by doping a core layer with a mixed solution of rare-earth element and metal ions using a solution doping method.

In addition, it is another object of the present invention to provide an optical fiber for an optical amplifier which can obtain a high and stable doping concentration and can obtain proper optical amplification characteristics by adjusting the concentration of doping ions and the profile of a refractive index.

Moreover, it is another object of the present invention to provide a silica optical fiber for an optical amplifier capable of optical amplification in the 1480 nm band by overcoming the problem that $Tm^{3+}$ ions generate fluorescence in the 1480 nm band only in fluoride or sulfide glasses with low lattice vibration energy.

To achieve the above objects, the present invention provides an optical fiber for an optical amplifier having a substrate tube, a clad and a core, comprising a first core layer with doped impurities including $Tm^{3+}$ ions and metal ions; and a second core layer formed on the outer surface of the first core layer, without doped impurities; wherein the optical fiber includes silica, germanium and fluoride as a base material whereby the optical fiber is used for the optical amplifier in the band of 1430 nm to 1530 nm.

In addition, there is provided a method for manufacturing an optical fiber for an optical amplifier according to the present invention, comprising the steps of: forming a clad layer and a second core layer in a silica substrate tube using the MCVD method to manufacture a preform of the optical fiber; forming a first core layer on an inner surface of the second core layer, wherein the first core layer is partially sintered to provide a host for $Tm^{3+}$ ions and metal ions; uniformly doping the first core layer with a solution comprising $Tm^{3+}$ ions and metal ions; and making the perform collapse so as to obtain a bar-shaped perform and drawing the bar-shaped perform into an optical fiber having a predetermined diameter.

Hereinafter, a preferred embodiment of the present invention will be described in detail with reference to the accompanying drawings.

It should be considered that the embodiment does not limit the scope and spirit of the present invention, but is only to illustrate the present invention.

Figure 1:
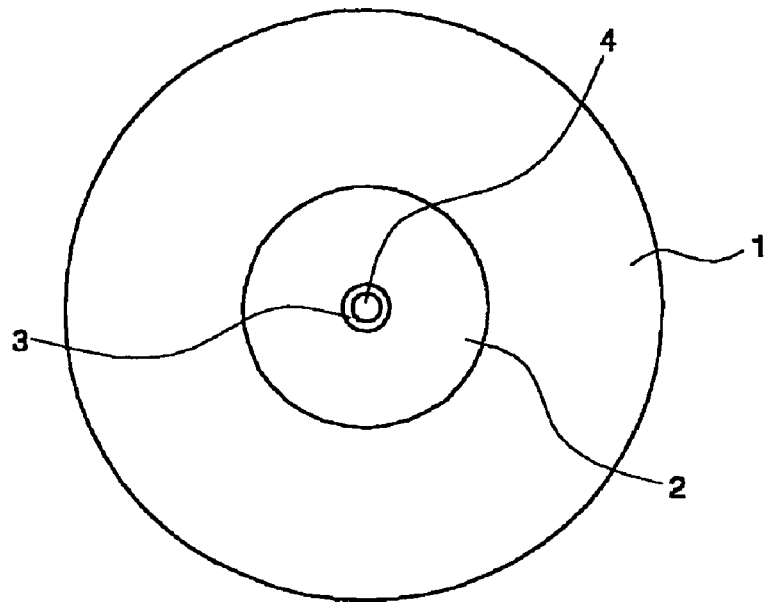
FIG. 1 is a view schematically showing the configuration of an optical fiber for an optical amplifier.
Figure 2:
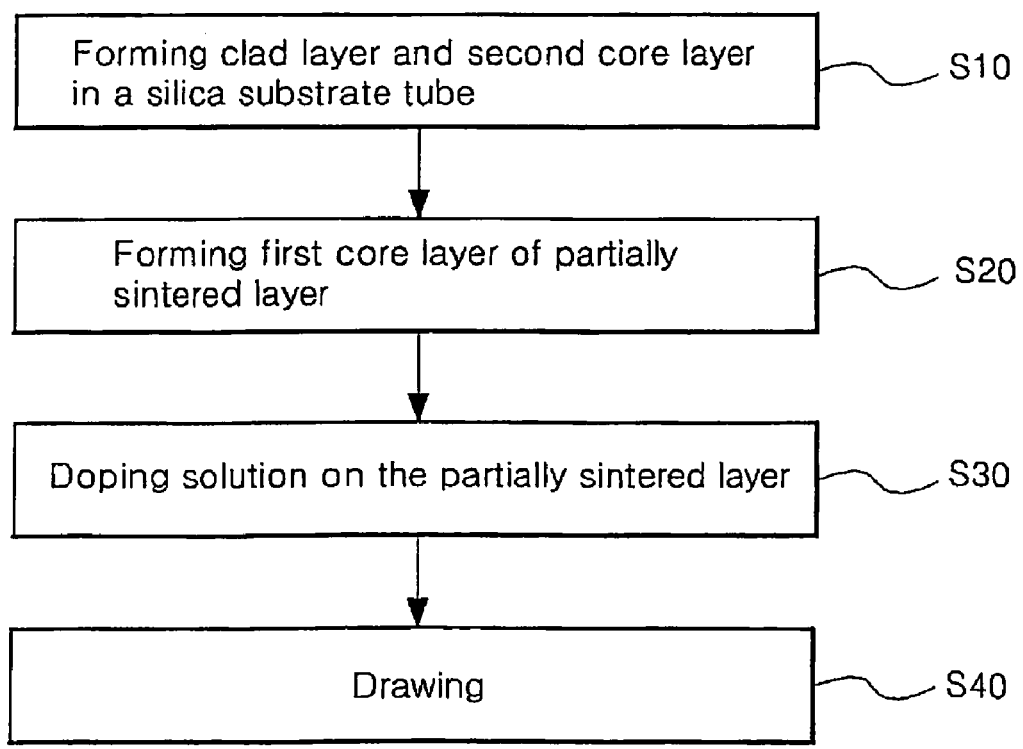
FIG. 2 is a flow chart schematically showing a method for manufacturing the optical fiber for the optical amplifier.

FIG. 1 is a view schematically showing the configuration of an optical fiber for an optical amplifier in accordance with the present invention. FIG. 2 is a flow chart schematically showing a method for manufacturing the optical fiber for the optical amplifier in accordance with the present invention.

As shown therein, the optical fiber for the optical amplifier according to the present invention includes a first core layer 4 formed on the center of a preform, a second core layer 3 formed on the outer surface of the first core layer 4, a clad layer 2 formed on the outer surface of the second core layer 3 and a substrate tube 1 formed on the outer surface of the clad layer 2.

That is, in the present invention, silica, germanium and fluoride are used as a base material so that the optical fiber can be used as an optical amplifier in a band ranging from 1430 nm to 1530 nm. At the center of the core layer, the first core layer 4 doped with impurities including $Tm^{3+}$ ions and metal ions is formed, and, the second core layer without impurities doped is formed on the outer surface of the first core layer 4.

Preferably, the doped impurities further include the rare-earth ions selected from the group consisting of Ho, Tb, Eu, Dy, Yb, Er, Pr and mixtures thereof.

The metal ions are selected from the group consisting of Al, La, Te and mixtures thereof. Preferably, the metal ions are Te ions.

Although the core layer of the invention is subdivided into the first core layer 4 doped with impurities and the second core layer 3 with no impurities doped, it may be a single layer doped with impurities.

Preferably, the pumping source of the optical fiber for the optical amplifier is a laser or laser diode providing a pumping signal having a wavelength at which $Tm^{3+}$ ions are absorbed.

The method for manufacturing an optical fiber according to the present invention will now be described.

Firstly, silicon tetrachloride, germanium tetrachloride and fluoride are fed in a vapor state to a silica substrate tube 1 which is heated while being rotated with moving the heat source around the substrate tube. By depositing the particles on the inner wall of the substrate tube 1 with sintering the particles, formed is a clad layer 2 having a refractive index of about 0.2% smaller than or the same as that of the substrate tube 1.

Then, silicon tetrachloride and germanium tetrachloride are fed in a vapor state, heating the substrate tube 1 while is rotated simultaneously with moving an heat source around the substrate tube, wherein the particles are deposited on the cladding layer with sintering the particles thereby forming a second core layer 3 having a refractive index of about 0.2 to 1.2% higher than that of the substrate tube 1.

As described above, after forming the clad layer 2 and the second core layer 3 on the silica substrate tube 1 using the MCVD method, the first core layer 4 is formed in the same way as the method for forming the second core layer 3, except that the heating temperature is lower for a partial sintering, instead of complete sintering at the high temperature, thereby providing a host for impurities S20.

Such a host must be optimized so that chemical substances to be deposited can have a porous structure with respect to impurities.

The partial sintering is needed because it is difficult to form a space within the first core layer 4 portion and thus doping is not carried out efficiently in the case of perfect sintering.

After the step S20 of forming a partially sintered layer providing a host for $Tm^{3+}$ ions and metal ions, a mixed solution comprising $Tm^{3+}$ ions and metal ions is applied and maintained for about one hour whereby the partially sintered layer S30 is uniformly doped.

Preferably, the metal ions are selected from the group consisting of Al, Te, La and mixtures thereof. Advantageously, the doping solution may further include rare-earth ions selected from the group consisting of Pr, Er, Nd, Eu, Tb, Dy, Ho, Yb and mixtures thereof.

The doping solution is prepared using a solvent capable of dissolving rare earth ions and metal ions, such as water, acetone or alcohol.

After the above-described solution doping step S30, the doping solution is dried and the partially sintered layer provided as the host is completely sintered. Then, the preform is made to collapse at a high temperature into a bar-shaped perform containing the $Tm^{3+}$ ions and metal ions, that is then drawn to obtain the optical fiber having a predetermined diameter to be used for an optical amplifier S40.

Preferably, the core layer has a diameter of about 1 to 6 μm and the optical fiber has a 125 μm diameter. The optical fiber can have a cutoff wavelength of less than 1250 nm by adjusting the diameter and refractive index of the core layer.

The following equation is known to this related art.

$$V = \frac{2\pi}{\lambda} a n_1 \sqrt{2\Delta}$$

wherein α is a radius of the core, $n_1$ is an refractive index of the core, $n_2$ is a refractive index of the clad, λ is a wavelength of light, and $$\Delta = \frac{n_1^2 - n_2^2}{2n_1^2}.$$

In this equation, the value of λ shown when the value of V is smaller than 2.405 becomes a cutoff wavelength.

Thus, the size and refractive index of the core is determined through the equation:

$$\lambda > \frac{2\pi}{2.405} a n_1 \sqrt{2\Delta},$$

thereby controlling the cutoff wavelength as desired.

Meanwhile, $Tm^{3+}$ ions doped to the first core layer 4 of the optical fiber cause a emission of 1480 nm fluorescence by the transition from $^3H_4$ level to $^3F_4$ level and metal ions, such as Al, Te and La, extend a light amplification band and reduce a lattice vibration energy of the preform.

Preferably, the content of the $Tm^{3+}$ ions is 100 to 20,000 ppm and the content of the metal ions is 0.01 to 10 mol %.

Advantageously, the first core layer 4 may be doped with Te ions in order to prevent the energy caused by the transition of $Tm^{3+}$ from $^3H_4$ to $^3H_5$ level from being absorbed into the base material by lattice vibration in the wavelength band ranging between 1430 nm and 1530 nm. Also, the first core layer 4 is preferably doped with metal ions, Al or La, in order to increase the solubility of the rare-earth ions for doping and light amplification range.

The fluorescence lifetime at $^3F_4$ level (lower level) of $Tm^{3+}$ is longer than that at $^3H_4$ level where 1480 nm fluorescence is generated, which makes a spontaneous fluorescence generation difficult. Therefore, preferably added to the solution for doping the first core layer 4 are Ho, Dy, Eu and Tb ions which play a role to reduce the fluorescence life time at $^3F_4$ level by energy transfer.

The content of the added rare-earth ions is preferably 0.01 to 5 mol %.

As above-mentioned, the interval between $^3H_4$ level and $^3H_5$ level of $Tm^{3+}$ ions is about 4200 $cm^{-1}$ (John B. MacChensey, David J. DiGiovanni, J. Am. Ceram. Soc., 73[12], 1990). In case fluorescence emission is induced by using a silica glass having a lattice vibration energy of about 1100 $cm^{-1}$, a transition is made from the $^3H_4$ level to the $^3F_4$ level without causing a fluorescence emission and heat is absorbed into the base material by the lattice vibration.

To overcome these problems, fluoride glass and sulfide glass have been studied. U.S. Pat. No. 6,266,181 discloses an optical fiber amplifier using a tellurite glass as a base material. Besides, according to an article by Y. G. Choi (Influence of 4f absorption transitions of $Dy^{3+}$ on the emission spectra $Tm^{3+}$-doped tellurite glasses, Journal of Non-Crystalline Solids, 276, pp 1-7, 2000), 1480 nm fluorescence is obtained.

However, when fluoride glass, sulfide glass or tellurite glass is connected to the silica-based optical fiber, the quality of signal is degraded incurring the loss of signal due to the differences in their own refractive indexes. Furthermore, conventional fusion splicing procedures cannot be applied because of the difference of more than about 500° C. in softening temperatures of those fibers.

Furthermore, since an optical fiber is manufactured by a fusion method using a furnace, the optical fiber may be easily contaminated by impurities, such as $OH^-$ groups and transition metals, thereby causing a defect to the optical fiber.

Hence, in the present invention, in order to manufacture a silica-based optical fiber having low lattice vibration energy, Te, Al and La are co-doped to make the local environment around rare-earth ions different, which makes it possible to obtain fluorescence emission of the 1480 nm band from the silica optical fiber.

Figure 3:
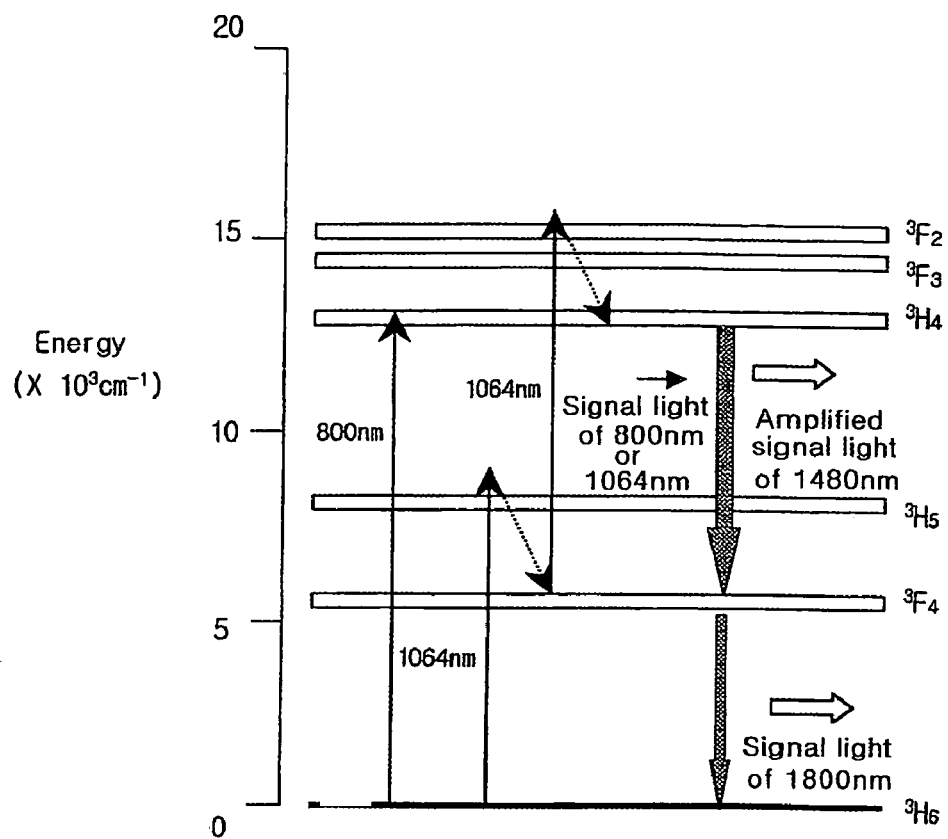
FIG. 3 is a view showing an energy level diagram $Tm^{3+}$ ions.

FIG. 3 is a view showing an energy level diagram of $Tm^{3+}$ ions, wherein $Tm^{3+}$ ions are excited from the ground state to $^3H_4$ level by 800 nm pumping light and the transition to $^3F_4$ level is made to cause 1480 nm fluorescence emission. In addition, 1800 nm fluorescence is emitted as the transition is made from $^3F_4$ to $^3H_6$ level which is the ground state.

Also, the $Tm^{3+}$ ions are excited to $^3H_5$ level by the pumping light of 1064 nm, then are excited to $^3F_2$ level. From said level, the ions spontaneously fall to $^3H_4$ level by lattice vibration and the transition to $^3F_4$ level is made, thus causing 1480 nm fluorescence emission.

As described above, the present invention provides an optical fiber for an optical amplifier wherein the first core layer 4 of silica glass is doped with rare-earth ions and other metal ions. The optical fiber is manufactured by the MCVD (Modified Chemical Vapor Deposition) method, and $Tm^{3+}$ ions and other metal ions are doped by a conventional solution doping method.

An optical amplifier can be produced using the above optical fiber, and preferably, the pumping source used in the optical amplifier is a laser and laser diode providing a pumping signal having a wavelength corresponding to an absorption peak of $Tm^{3+}$ ions.

EMBODIMENT

Figure 4:
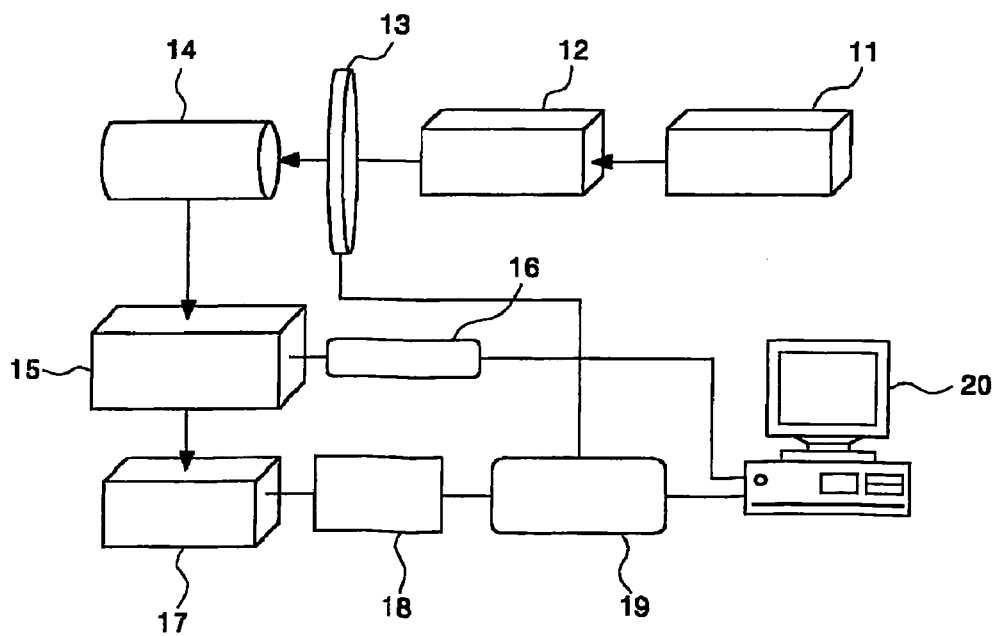
FIG. 4 is a view showing a. fluoremetery apparatus for measurement on a preform for an optical amplifier.

FIG. 4 is a view showing a fluoremetery apparatus for measurement on a preform for an optical amplifier which is manufactured in accordance with the present invention. The preform 14 of optical fiber comprises Tm, Tb, Al and Te ions added to a core. A fluorescence spectrum and an absorption spectrum were obtained using a proper sample prepared for measurement.

The sample has a diameter of 15 mm, a height of 20 mm and a core size of 1.13 mm. The concentration of $Tm^{3+}$ ions is 0.16 wt % as the result of measurement using EPMA (Electron Probe Micro Analysis). The cross section of the sample is optically abraded to less than 1 μm and the experiment is performed at a room temperature.

In detail, $Tm^{3+}$ ions was excited by a Ti-Sapphire laser 12 of the 800 nm wavelength, which was driven by an Ar laser 11 of the 488 nm wavelength, and light was separated by wavelengths using a monochrometer 15. A signal light was measured using an InSb detector 17 and then a fluorescence spectrum was obtained using a computer 20.

In other words, a fluorescence spectrum from the spontaneous fluorescence emission was obtained using the InSb detector 11 (manufactured by EG & G) capable of detecting a light in a range from 550 to 2800 nm by irradiating a light source of the Ti-Sapphire laser 12 with a 800 nm wavelength and a 1.3W incident light strength to the core portion of a prepared perform.

The monochrometer 15 of ¼ m was used. A lock-in-amplifier 13 and a chopper 7 rotating 100 times per sec were used for amplifying a signal from the detector 17.

In addition, the absorption spectrum was measured using a Lambda 900 UV/VIS/NIR spectrometer of PerkinElmer by processing the preform into a disk shape.

Reference numeral 16 and 18 refer to a monochrometer controller and reference numeral, respectively.

Figure 5:
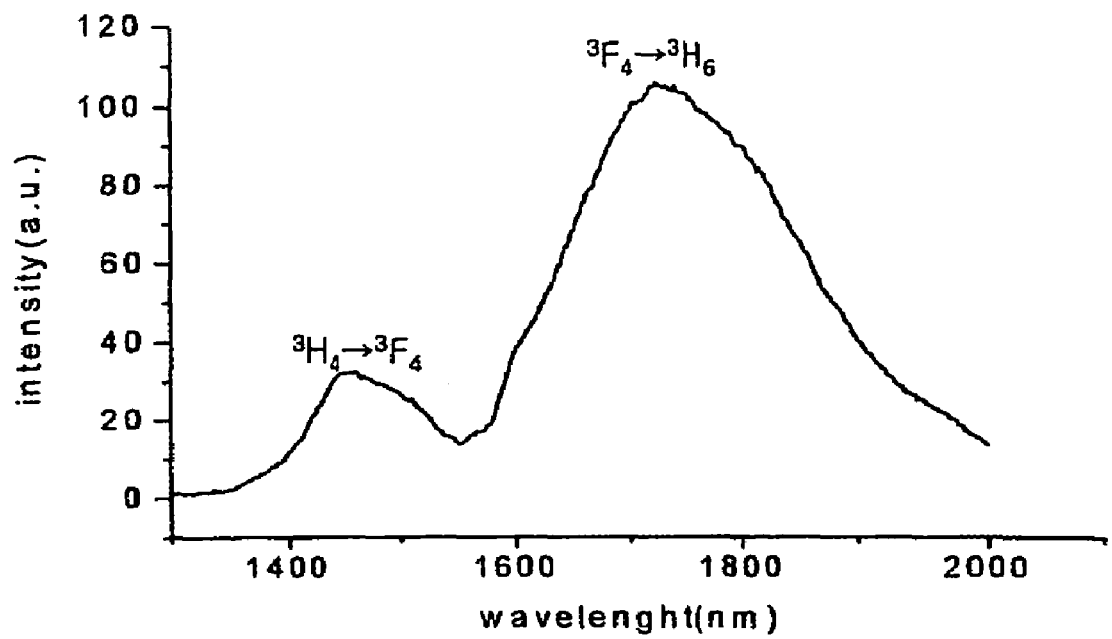
FIG. 5 is a fluorescence spectrum showing 1480 nm and 1800 nm fluorescence emission of $Tm^{3+}$ ions.

FIG. 5 is a fluorescence spectrum showing 1480 nm and 1800 nm florescence emission of $Tm^{3+}$ ions by irradiating a laser of 800 nm wavelength to the preform for the optical amplifier in accordance with the present invention.

Figure 6:
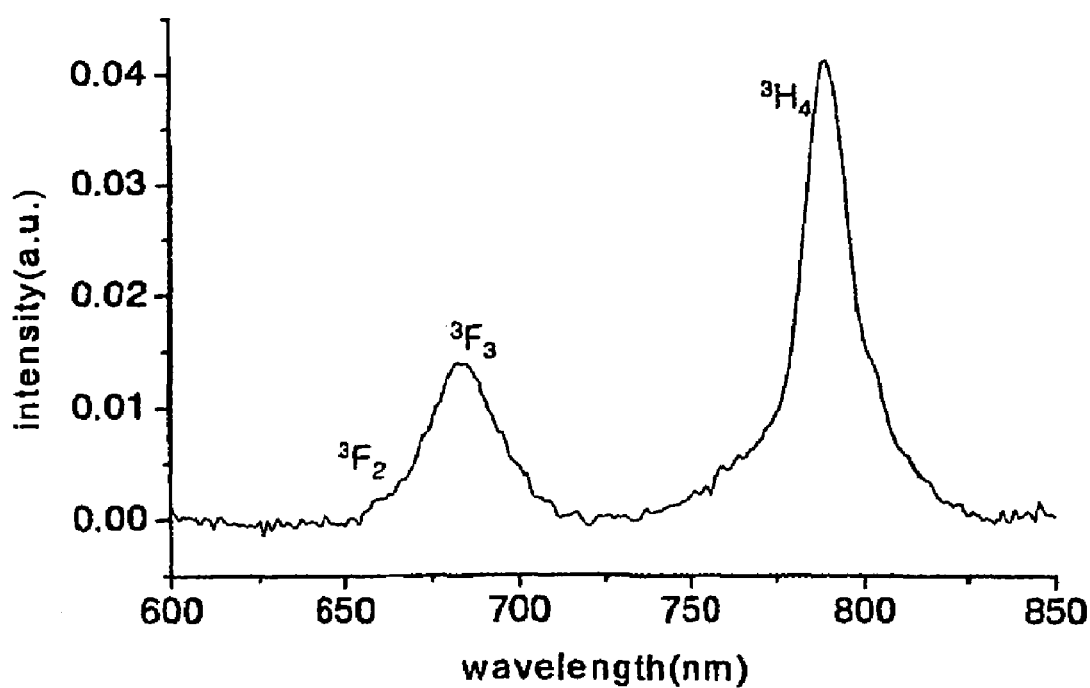
FIG. 6 is an absorption spectrum of $Tm^{3+}$ ions in a range from 600 nm to 850 nm band.

FIG. 6 is an absorption spectrum of $Tm^{3+}$ ions in a range from 600 nm to 850 nm band, which was obtained from the preform for the optical amplifier according to the present invention, wherein and $^3F_3$ and $^3F_2$ level thermally connected with each other and $^3H_4$ level of $Tm^{3+}$ ions are observed at the range between 650 nm and 700 nm wavelength and 800 nm wavelength, respectively.

Figure 7:
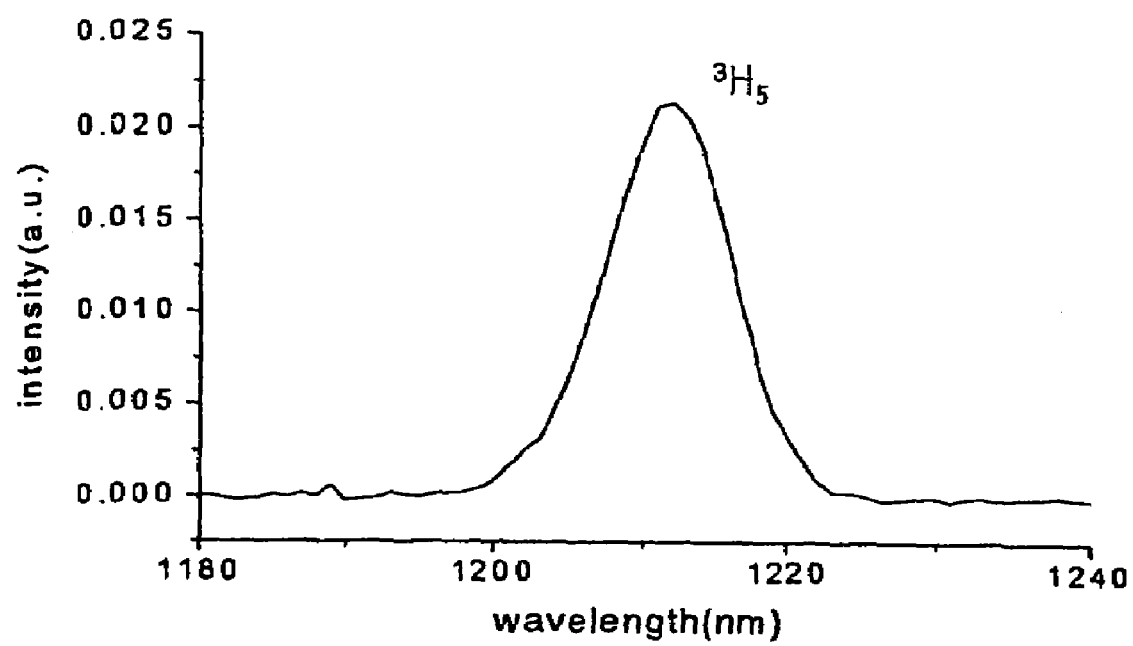
FIG. 7 is an absorption spectrum of $Tm^{3+}$ ions in a range from 1150 nm to 1250 nm.

FIG. 7 is an absorption spectrum of $Tm^{3+}$ ions in a range from 1150 nm to 1250 nm, obtained from the preform for the optical amplifier in accordance with the present invention, wherein $^3H_5$ level of $Tm^{3+}$ ions are observed at the 1210 nm wavelength.

While the invention has been particularly shown and described with reference to a preferred embodiment thereof, it will be understood by those skilled in the art that the foregoing and other changes in form and details can be made within the spirit and scope of the invention.

INDUSTRIAL APPLICABILITY

The optical fiber for an optical amplifier according to the present invention can be used in the band ranging between 1430 to 1530 nm with low manufacturing cost and offering stable optical characteristics and convenience.

According to the present invention, high and stable doping concentration can be obtained and, in addition, proper optical amplification characteristics is obtained by adjusting the concentration of doping ions and the profile of a refractive index.

Moreover, this present invention can provide a silica-based optical fiber for an optical amplifier capable of optical amplification in the band of 1480 nm by overcoming the problem that $Tm^{3+}$ ions generate fluorescence in the 1480 nm band only in fluoride or sulfide glass with low lattice vibration energy.

The invention claimed is:

1. An optical fiber for an optical amplifier having a clad and a core, the core comprising:
    a first core layer doped with first impurities comprising $Tm^{3+}$ ions and metal ions selected from the group consisting of Al, La, Te and mixture thereof; and
    a second core layer surrounding the outer surface of the first core layer and containing no doped impurities comprising Tm ions and metal ions selected from the group consisting of Al, La, Te and mixture thereof;
    wherein each of said clad, first core layer and second core layer of the optical fiber is a silica-based glass fiber which contains fluoride of a constant concentration, the optical fiber being used for the optical amplifier in the signal band of 1430 nm to 1530 nm.

2. The optical fiber set forth in claim 1, wherein the first impurities added to the first core layer further comprises rare-earth ions selected from the group consisting of Ho, Tb, Eu, Dy, Yb, Er, Pr and mixtures thereof.

3. The optical fiber set forth in claim 1, wherein a cutoff wavelength of less than 1250 nm is maintained by adjusting the diameter and refractive index of the core.

4. The optical fiber set forth in claim 1, wherein a laser or laser diode having the wavelength at which $Tm^{3+}$ ions are absorbed is used as a pumping source of the optical fiber for an optical amplifier.

5. An optical amplifier using the optical fiber in claim 1.

* * * * *